United States Patent [19]
Riegler et al.

[11] 3,910,653
[45] Oct. 7, 1975

[54] SELF ADJUSTING TRUNNION BEARING SEAL ARRANGEMENT

[75] Inventors: Ernst Riegler, Enns; Manfred Schmidt, Linz, both of Austria

[73] Assignee: Vereinigte Österreichische Eisen- und Stahlwerke - Alpine Montan Aktiengesellschaft, Austria

[22] Filed: Oct. 31, 1973

[21] Appl. No.: 411,429

[30] Foreign Application Priority Data
Jan. 30, 1973   Austria .................. 775/73

[52] U.S. Cl. ...................... 308/36.1; 308/72
[51] Int. Cl.² .................. F16C 1/24; F16C 33/76; F16J 15/32; F16J 15/38
[58] Field of Search ............... 105/9, 15, 36.1, 36.3, 105/72, 73, 77, 78

[56] References Cited
UNITED STATES PATENTS
2,149,712   3/1939   Wallgren .................. 308/73
3,427,081   2/1969   Dellinger .................. 308/15
3,588,201   6/1971   Schmidt .................. 308/36.1

FOREIGN PATENTS OR APPLICATIONS
293,808   10/1971   Austria .................. 308/36.1

Primary Examiner—M. Henson Wood, Jr.
Assistant Examiner—Howard Beltran
Attorney, Agent, or Firm—Brumbaugh, Graves, Donohue & Raymond

[57] ABSTRACT

The invention relates to a fixed bearing assembly for a carrying trunnion of a tiltable converter comprising a bearing arranged on said carrying trunnion and capable of taking up angular and drunken (wobbling) movements of the trunnion, and annular sealing means of resilient material. The bearing is arranged in a housing with a bearing foot and cover and fixed in position by means of spacer rings. The spacer rings engage the housing covers by means of spherical sealing faces whose central point coincides with the centre of the bearing. The sealing means are arranged in annular recesses between said spherical faces.

3 Claims, 2 Drawing Figures

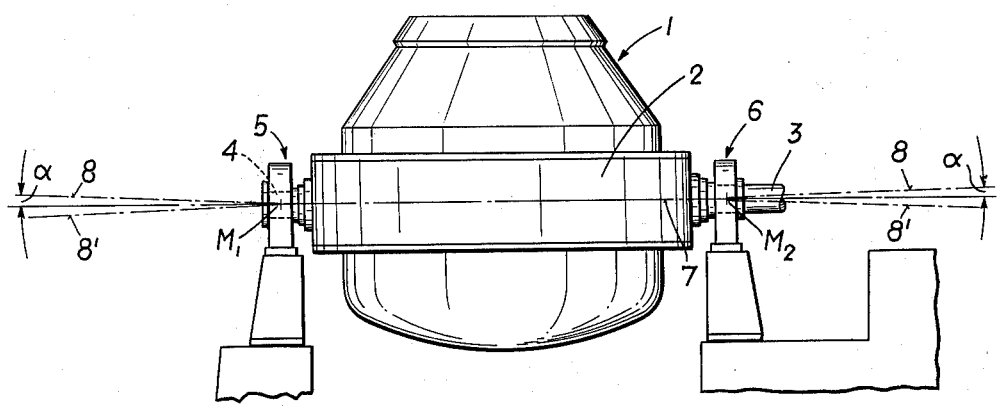
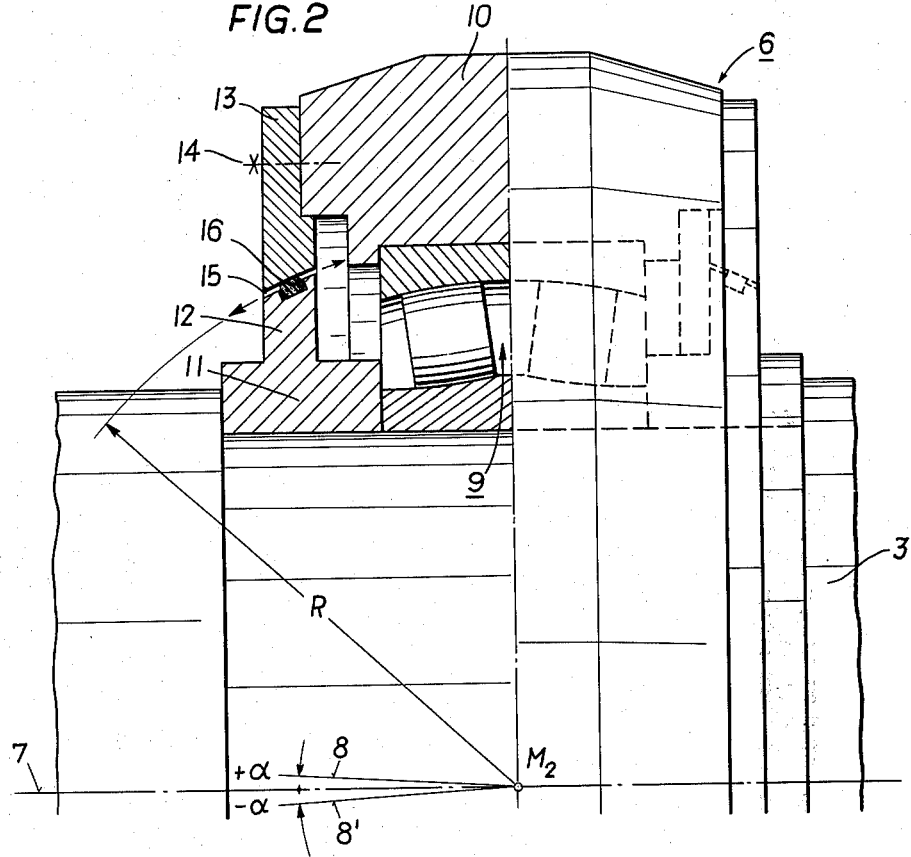

SELF ADJUSTING TRUNNION BEARING SEAL ARRANGEMENT

The invention relates to a fixed bearing assembly for a carrying trunnion of a tiltable converter comprising a bearing arranged on said trunnion and capable of taking up angular and drunken (wobbling) movements of the trunnion and fixed in position by means of spacer rings in a housing having a bearing foot and cover, and annular sealing means of plastic material, such as rubber and the like. It should be noted that in the specification and in the appended claims the terms bearing is meant to refer to slide-articulation bearings or to roller bearings.

Converter bearings, which accommodate carrying loads of more than 1000 mt (metric tons), are exposed to the influences of heat and dust and must absorb drunken or wobbling movements when the carrying trunnions are in oblique positions, must be constructed with great care, in particular with regard to sealing the inner space of the bearing against the intrusion of foreign bodies.

According to Austrian patent No. 293,808, a trunnion seal may be composed of a sealing line inserted into a groove surrounding the trunnion. The groove is formed of two section rings which may be drawn towards each other in an axial direction. These section rings, together with the sealing line, are radially displaceable within an annular recess of the bearing housing or a bearing cover, respectively, so that even when the carrying trunnion makes a drunken (wobbling) movement, the sealing effect is maintained. Although the considerations were correct on which this construction is based, operational practice has shown that the life of the sealing is insufficient. When the trunnion is positioned obliquely, the sealing line is greatly distorted owing to the radial sliding movement in the bearing housing. The sealing material is stressed thereby to more than its elastic limit so that its elastic properties gradually are lost. In the course of time, the bearing inner space will then be "opened up" so that entering dirt, solid slag, iron or other particles will soon damage the bearing and the converter operation has to be interrupted. The exchange of a heavy converter bearing is extremely expensive.

The present invention is aimed at avoiding the above disadvantages and difficulties and at creating a bearing construction in which the elastic sealing is not pressed together in the radial direction when the carrying trunnion makes a drunken (wobbling) movement and the forces acting upon the sealing means do not vary greatly.

In a fixed bearing construction of the kind defined in the introduction, these aims of the invention are achieved in that the spacer rings fixed to the trunnion engage the housing covers with spherical sealing faces whose central point lies in the centre of the bearing and between which faces the sealing means are arranged in annular recesses.

In order that the invention may be more fully understood, an embodiment thereof shall now be further explained with reference to the accompanying drawing.

FIG. 1 is a total lateral view of a converter with its carrying bearings, and

FIG. 2 is a partial sectional view in a schematical representation of one bearing of the converter of FIG. 1.

In FIG. 1 numeral 1 denotes a converter which is surrounded by a carrying ring 2 and tiltably supported by means of the carrying trunnions 3,4 in a movable bearing assembly 5 and a fixed bearing assembly 6. $M_1$ and $M_2$ denote the central points of the movable bearing assembly 5 and of the fixed bearing assembly 6, through which also the carrying trunnion axis 7 is laid. Owing to thermal influences the carrying trunnions 3,4 may be obliquely positioned. Such oblique axes are denoted with 8 and 8', the deviation $\alpha$ from the axis 7 amounting to about $\pm 1°$.

In order that no leakage occurs in the fixed bearing assembly 6 when the carrying trunnion 3 assumes an oblique position at the angle $\pm \alpha$, i.e. during a drunken movement, a bearing construction is used which is shown in a simplified manner in FIG. 2. To make the illustration more understandable, only the left upper part is shown in vertical section. The fixed bearing assembly 6 essentially consists of a slide-articulation bearing or roller bearing 9, which is surrounded by a housing 10. The housing is releasably connected with the bearing foot, which is not shown, and fixed in position by two spacer rings 11 arranged diametrically opposed to each other. These spacer rings 11 are fixed on both sides of the slide-articulation or roller bearing on the carrying trunnion 3 and are each provided with a flange-like stud 12 extending around their circumferences. To these flange-shaped studs 12 are joined annular housing covers 13, which are fixed laterally to the housing cover 10 by means of screws 14 (shown schematically). Between the studs 12 and the housing covers 13 spherical sealing faces 15 are provided. The central point M of the spherical faces with the radius R lies in the centre of the slide-articulation or roller bearing 9. Between the studs 12 and the housing covers 13 in annular recesses in the stud 12, seals 16 of plastic material, rubber, or the like are provided which are capable of withstanding operational temperatures of up to about 150°C.

The seals 16 may, for example, be O-rings and are not subjected to any additional pressure stress in a radial direction when the carrying trunnion 3 assumes an oblique position, whereby the spacer rings 11 are displaced in the directions of the arrows, together with their studs 12, relative to the housing covers 13. The spherical faces 15 have dimensions corresponding to the angular deviation of the carrying trunnion 3, and the sealing effect relative to the housing cover 13 remains intact no matter what position the stud 12 occupies. Consequently, no dirt may enter into the interior of the bearing. The sealing means 16 may easily be exchanged when the bearing covers 13 are opened.

What we claim is:

1. A bearing assembly for a carrying trunnion of a tiltable converter comprising, a bearing mounted on said trunnion and adapted to accommodate angular and wobbling movements of said trunnion, a bearing housing encircling said bearing, a pair of annular cover portions on said housing depending radially inward of said housing on either side of said bearing, each of said cover portions having an inner annular face radially spaced from said trunnion, a pair of spacer rings encircling said trunnion, one on either side of said bearing, to restrain said bearing against axial movement on said trunnion, each of said spacer rings including a flange like portion have an outer annular face extending radially outward to a position such that said outer annular face is opposed to an inner annular face of a respective one of said covers, the inner annular faces of said covers and the outer annular faces of said spacer rings being complementary spherical surfaces whose center is substantially at the center of said bearing, and an annular sealing element disposed between each pair of opposed annular faces, said sealing elements being retained in annular recesses formed in at least one face of each pair.

2. The bearing assembly of claim 1 wherein said sealing elements are in the form of O-rings and said annular recesses are formed in the outer annular face of said spacer rings.

3. The bearing assembly set forth in claim 1, wherein the material for the sealing elements is elastomeric.

* * * * *